(12) United States Patent  (10) Patent No.: US 7,970,353 B2
Forster  (45) Date of Patent: ***Jun. 28, 2011

(54) REFLECTIVE COMMUNICATION USING RADIO-FREQUENCY DEVICES

(75) Inventor: Ian J. Forster, Chelmsford (GB)

(73) Assignee: Mineral Lassen LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/712,765

(22) Filed: Feb. 25, 2010

(65) Prior Publication Data

US 2010/0151892 A1    Jun. 17, 2010

Related U.S. Application Data

(62) Division of application No. 10/423,824, filed on Apr. 25, 2003, now Pat. No. 7,697,946.

(60) Provisional application No. 60/385,603, filed on Jun. 4, 2002.

(51) Int. Cl.
*H04B 7/00* (2006.01)

(52) U.S. Cl. .................................. 455/41.2; 340/572.2

(58) Field of Classification Search ................. 455/41.2; 340/572.2, 572.7
See application file for complete search history.

(56) References Cited

U.S. PATENT DOCUMENTS

| | | |
|---|---|---|
| 3,593,143 A | 7/1971 | Nakahara |
| 4,028,667 A | 6/1977 | Breslau |
| 4,112,372 A | 9/1978 | Holmes |
| 5,271,034 A | 12/1993 | Abaunza |
| 5,406,262 A | 4/1995 | Herman |
| 5,465,395 A | 11/1995 | Bartram |
| 5,509,035 A | 4/1996 | Teidemann, Jr. |
| 5,559,828 A | 9/1996 | Armstrong |
| 5,559,980 A | 9/1996 | Connors |
| 5,593,744 A | 1/1997 | Van Vechten |
| 5,614,912 A | 3/1997 | Mitchell |
| 5,640,683 A | 6/1997 | Evans |

(Continued)

FOREIGN PATENT DOCUMENTS

EP    0899809 A2    3/1999

(Continued)

OTHER PUBLICATIONS

European Examination Report (Communication Pursuant to Article 94(3) EPC) mailed May 15, 2008, issued in corresponding Application No. EP 07000665.5, filed Jun. 4, 2003, 5 pages.

(Continued)

*Primary Examiner* — Yuwen Pan
(74) *Attorney, Agent, or Firm* — Christensen O'Connor Johnson Kindness PLLC

(57) ABSTRACT

A reflective communication system allows information from wireless communication devices, such as radio-frequency identification devices (RFID), to be reflectively communicated to a receiver. A transmitter at a known location transmits a communication signal to the wireless communication device. The wireless communication device modulates a data signal onto the communication signal to form a reflected data signal and reflects the reflected data signal to the receiver. The receiver receives the communication signal from the transmitter and can determine a distance between the wireless communication device and the transmitter based on data that includes a time delay between receipt of the communication signal and receipt of the reflected data signal by the receiver. The receiver can further determine the approximate location of the wireless communication device based on data that includes the known location of the transmitter and the determined distance between the wireless communication device and the transmitter.

20 Claims, 9 Drawing Sheets

U.S. PATENT DOCUMENTS

| | | |
|---|---|---|
| 5,648,765 A | 7/1997 | Cresap |
| 5,664,095 A | 9/1997 | Cox |
| 5,765,187 A | 6/1998 | Shimizu |
| 5,798,693 A | 8/1998 | Engellenner |
| 5,838,236 A | 11/1998 | Bentley |
| 5,867,500 A | 2/1999 | Dolman |
| 5,867,800 A | 2/1999 | Leif |
| 5,929,760 A | 7/1999 | Monahan |
| 5,936,527 A | 8/1999 | Isaacman |
| 6,114,971 A | 9/2000 | Nysen |
| 6,150,921 A | 11/2000 | Werb |
| 6,170,748 B1 | 1/2001 | Hash |
| 6,205,553 B1 | 3/2001 | Stoffel |
| 6,236,315 B1 | 5/2001 | Helms |
| 6,255,800 B1 | 7/2001 | Bork |
| 6,266,362 B1 | 7/2001 | Tuttle |
| 6,418,242 B1 | 7/2002 | Maurer |
| 6,418,527 B1 | 7/2002 | Rozenshein |
| 6,509,836 B1 | 1/2003 | Ingram |
| 6,650,225 B2 | 11/2003 | Bastian, II |
| 6,717,516 B2 | 4/2004 | Bridgelall |
| 6,812,824 B1 | 11/2004 | Goldinger |
| 6,832,302 B1 | 12/2004 | Fetzer |
| 6,898,434 B2 | 5/2005 | Pradhan |
| 7,084,740 B2 | 8/2006 | Bridgelall |
| 7,111,278 B1 | 9/2006 | Siska, Jr. |
| 2001/0016479 A1 | 8/2001 | Wood, Jr. |
| 2002/0083032 A1 | 6/2002 | Bourges-Sevenier |
| 2003/0007473 A1 | 1/2003 | Strong |
| 2004/0071136 A1 | 4/2004 | Laumen |
| 2005/0076331 A1 | 4/2005 | Das |
| 2006/0161988 A1 | 7/2006 | Costea |

FOREIGN PATENT DOCUMENTS

| | | |
|---|---|---|
| EP | 1122684 B1 | 8/2001 |
| GB | 2235336 A | 2/1991 |
| WO | 91 08557 A2 | 6/1991 |
| WO | 01 29574 A2 | 4/2001 |
| WO | 01 82520 A2 | 11/2001 |

OTHER PUBLICATIONS

"The Official Bluetooth SIG Website," Toshiba, <http://www.bluetooth.com> [retrieved Aug. 6, 2001], 3 pages.

REFLECTIVE COMMUNICATION USING RADIO-FREQUENCY DEVICES

CROSS-REFERENCES TO RELATED APPLICATIONS

This application is a divisional of U.S. patent application Ser. No. 10/423,824, filed Apr. 25, 2003, now U.S. Pat. No. 7,697,946, issued Apr. 13, 2010, which claims the benefit of U.S. Provisional Patent Application No. 60/385,603, filed Jun. 4, 2002, the disclosures of which are incorporated by reference herein in their entirety.

FIELD

The present application relates to use of radio-frequency devices to reflectively communicate information to a receiver using a communication signal from a local transmitter.

BACKGROUND

Wireless communication devices are commonly used today to wirelessly communicate information about goods. For example, transponders may be attached to goods during their manufacture, transport and/or distribution to provide information, such as an identification number, expiration date, date of manufacture or "born on" date, lot number, and the like. The transponder allows this information to be obtained unobtrusively using wireless communication without slowing down the manufacturing, transportation, and/or distribution process.

Short-range transmitters or interrogation devices are located throughout the manufacturing facility to communicate with the wireless communication devices associated with goods during their manufacture, transport and/or distribution. These transmitters are located in specific areas within the facility to interrogate the wireless communication devices in defined areas. The transmitters are typically located apart from each other so that their radio-frequency signals do not overlap with one another. A common facility may have to contain hundreds if not thousands of transmitters so that wireless communication devices in all areas of the facility can be interrogated by a transmitter.

The information received by the transmitters from wireless communication devices is typically communicated back to a central processing receiver or hub using a communications network. The hub processes all of the information for any number of reasons, including, but not limited to, tracking and monitoring of the goods. Due to the large number of transmitters required, the communications network linking the transmitters to the hub can be quite complex and involve hundreds if not thousands of wiring connections, thereby causing additional installation and material expense above the expense of the transmitters and the hubs. If the additional expense of this communication network could be eliminated, the prohibitive nature of implementing a wireless communication system using wireless communication devices in manufacturing and/or distribution facilities would be lessened.

SUMMARY

In at least one aspect, disclosed herein is a reflective communication system that allows information from wireless communication devices, such as radio-frequency identification devices (RFID), to be reflectively communicated to a receiver in lieu of using a separate communication system. A transmitter transmits a communication signal having a carrier frequency to a wireless communication device to provide power. The wireless communication device rectifies the communication signal for power and modulates a data signal onto the communication signal to form a reflected data signal. Instead of the transmitter also receiving back the reflected data signal from the wireless communication device and separately re-transmitting the reflected data signal to a receiver using a separate communication system, the wireless communication device reflects the reflected data signal directly to a receiver. In this manner, the process of communicating information from a wireless communication device is accomplished in one communication system rather than two.

In one embodiment, a transmitter transmits a communication signal having a carrier frequency to a wireless communication device. The wireless communication device receives the communication signal and reflectively modulates a data signal containing data stored in the wireless communication device to form a reflected data signal. A receiver receives the reflected data signal and demodulates the carrier frequency and the modulated data signal from the reflected data signal to recover the data in clear format. The data may be any type of information, including information about goods or a container associated with the wireless communication device.

In another embodiment, multiple transmitters are placed in the vicinity of wireless communications devices. The receiver receives reflected data signals from wireless communication devices that were interrogated by one or more transmitters.

In another embodiment, a single transmitter is coupled to a leaky-feeder cable to provide an antenna for transmitting communication signals to wireless communication devices. The cable has a plurality of openings that leak and radiate out the communication signal transmitted by the transmitter. In this manner, the communication signal radiates at multiple locations at the points of the openings in the cable simulating multiple transmitters.

In another embodiment, the communication signal is mixed with a direct spread spectrum code to spread the communication signal. Multiple transmitters communicate the communication signal at the same operating frequency, but using different spread spectrum codes. The wireless communication device receives the spread communication signal and reflectively modulates a data signal to form a reflected data signal. This reflected data signal is spread due to the communication signal being spread. The receiver sequences through the spread spectrum codes in the spread spectrum coding sequences to recover the original, unspread reflected data signal. The receiver can determine which transmitter transmitted the communication signal contained in the reflected data signal since the receiver knows each spread spectrum code for each of the transmitters.

If the receiver desires to listen to reflected data signals that originated from wireless communication devices in the field of view of a particular transmitter, the receiver can set its spread spectrum code to only mix the spread spectrum code of a particular transmitter with the reflected data signal. In this manner, the receiver will only recover the data from a wireless communication device that is in the field of view of a selected transmitter.

In another embodiment, the receiver receives the communication signal directly from the transmitter as well as the reflected data signal from a wireless communication device. In this manner, the receiver can compare the time delay between the directly received communication signal and the communication signal component of the reflected data signal from the wireless communication device to determine the distance between the wireless communication device and a transmitter. If this embodiment is used in conjunction with the spread spectrum coding embodiment, the receiver can determine the approximate location of the wireless communication device by knowing (1) the distance between the transmitter and the wireless communication device and (2) the particular transmitter that interrogated the wireless communication device. If transmitters are located so that multiple transmitters can transmit communications signals to a single wireless communication device, and the receiver knows the distance between transmitters, the receiver can determine the exact location of the wireless communication device using triangulation in this embodiment.

In another embodiment, the communication signal received by the wireless communication device to power the wireless communication device is received from an incident radio signal from a separate communication system. In one embodiment, the transmitter is a Bluetooth transceiver. A receiver is configured with two antennas to receive the Bluetooth communications signal and the reflected data signal. The receiver mixes the two signals together to remove the Bluetooth communication signal from the reflected data signal to obtain the data in clear format.

In another Bluetooth embodiment, the transmitter and receiver functionality are combined in a single Bluetooth transceiver.

Those skilled in the art will appreciate the scope of the present application and realize additional aspects thereof after reading the following detailed description of the preferred embodiments in association with the accompanying drawing figures.

DESCRIPTION OF THE DRAWINGS

The accompanying drawing figures incorporated in and forming a part of this specification, together with the description, serve to explain the principles of various embodiments of the invention disclosed herein.

DETAILED DESCRIPTION

The present application relates to a reflective communication system that allows information from wireless communication devices, such as radio-frequency identification devices (RFID), to be reflectively communicated to a receiver in lieu of using a separate communication system. A transmitter transmits a communication signal having a carrier frequency to the wireless communication device to provide power. The wireless communication device modulates a data signal onto the communication signal to form a reflected data signal. Instead of the transmitter also receiving back the reflected data signal from the wireless communication device and re-transmitting the reflected data signal to a receiver using a separate communication system, the wireless communication device reflects the reflected data signal directly to the receiver. In this manner, the process of communicating information from a wireless communication device to a receiver is accomplished in one communication system rather than two.

Figure 1:
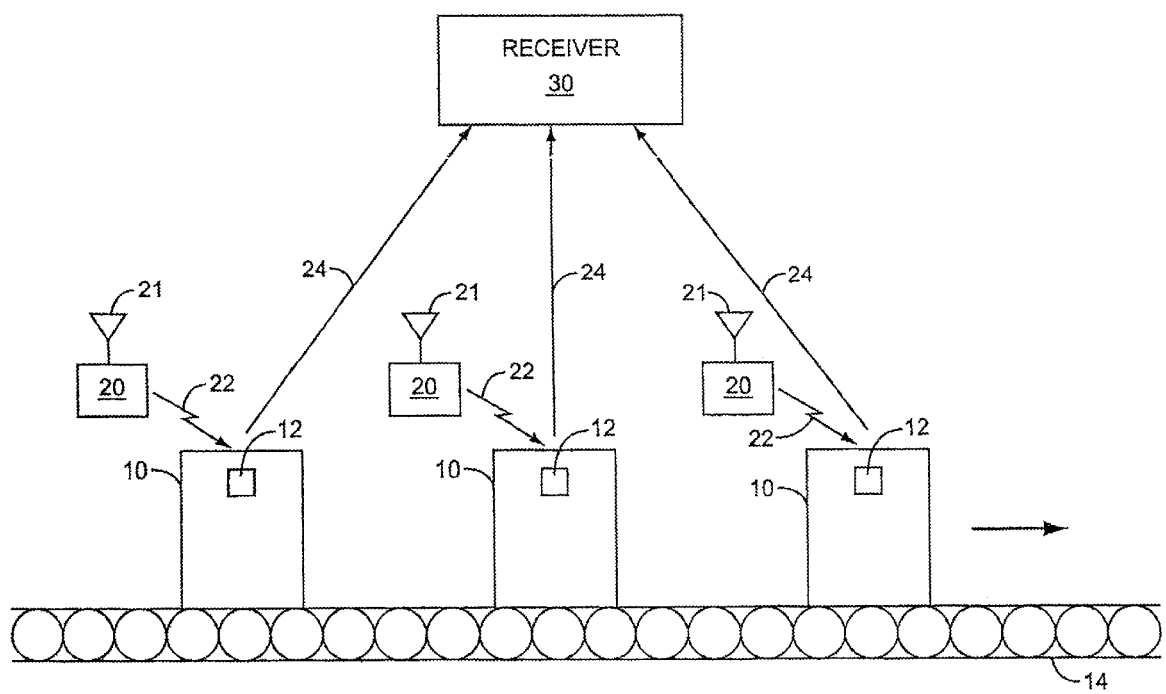
FIG. 1 is a schematic diagram of a communication system using reflective communication.

Turning now to FIG. 1, a communication system according to at least one embodiment of the present invention is disclosed. Containers 10 containing wireless communication devices 12 are being transported in a manufacturing facility on an assembly line 14. The wireless communication device 12 may contain information relating to its associated container 10, such as its identification, the type of goods transported in the container 10, the date of manufacture or "born on" date of the goods in the container 10, etc. The containers 10 come into proximity to transmitters 20 placed in positions that are in close vicinity to the containers 10 during their manufacture and/or transport. The transmitter 20 may be an interrogation reader that interrogates a RFID, such as that described in co-pending patent application Ser. No. 09/712, 645 entitled "Wireless Transport Communication Device and Method," filed on Nov. 14, 2000, and incorporated herein by reference in its entirety.

The transmitter 20 continuously transmits a communication signal 22 through its antenna 21 to any wireless communication devices 12 in the field of view of the antenna's 21 radiation. The transmitter 20 is powered by either a direct current (DC) or alternating current (AC) power source. When the wireless communication device 12 receives the communication signal 22 from the transmitter 20, the wireless communication device 12 rectifies the signal to power the wireless communication device 12. The wireless communication device 12 reflectively modulates the incoming energy with a data signal containing information stored in the wireless communication device 12, such as information relating to its associated container 10, for example, to create a reflected data signal 24. For example, the incoming energy from the communication signal 22 could be reflectively modulated with a Manchester bi-phase encoded data sequence to generate the data signal. The reflected data signal 24 is reflected to a receiver 30.

For a detailed explanation on how a wireless communication device 12 can be powered using an incoming communication signal and how a wireless communication device 12 reflects an incoming communication signal 22 to communicate information, see U.S. Pat. No. 5,347,280 entitled "Frequency Diversity Transponder Arrangement," incorporated herein by reference in its entirety.

The wireless communication device 12 may be either an active/semi-passive or passive device. An active or semi-passive wireless communication device 12 contains its own power source for transmission of information. The power source may be a battery, for example. A passive wireless communication device 12 uses rectified power from an incoming communication signal 22 as the sole source of energy to provide power to the wireless communication device 12 for reflective communication of information. If the wireless communication device 12 is a passive device, the reflected data signal 24 tends to be strong due to the high power in the communication signal 22 required to also provide power to the wireless communication device 12.

Figure 2:
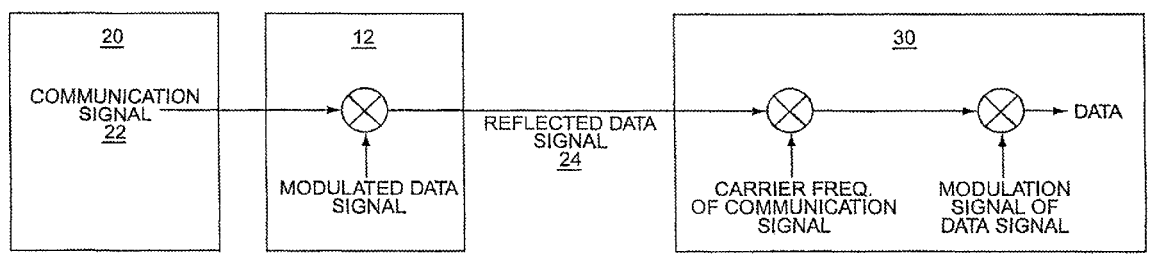
FIG. 2 is a schematic signal diagram of the communication system illustrated in FIG. 1.

FIG. 2 illustrates a schematic signal diagram of the communication system illustrated in FIG. 1. The communication signal 22 transmitted by the transmitter 20 is modulated with a carrier frequency. The carrier frequency is also present on the reflected data signal 24 since the wireless communication device 12 forms the reflected data signal 24 by reflecting the incoming communication signal 22. When the receiver 30 receives the reflected data signal 24, it demodulates the carrier frequency contained on the communication signal 22 to create the data signal previously modulated by the wireless communication device 12. The data signal is demodulated so that the data can be obtained in clear format. The data contains the information stored in the wireless communication device 12 and may be related to data concerning its associated container 10. In this embodiment, the receiver 30 must have knowledge of the carrier frequency used by the transmitter 20 to create the communication signal 22 and the modulation placed onto the data signal by the wireless communication device 12 so that receiver 30 can demodulate the carrier frequency and the data modulation from the reflected data signal 24.

In another embodiment, and as illustrated in FIG. 1, multiple transmitters 20 are placed in the manufacturing and/or distribution facility. All of the reflected data signals 24 from the wireless communication devices 12 are reflected to the single receiver 30. In this manner, the receiver 30 receives information from all of the wireless communication devices 12 at one location. Since this information may include a unique identification, this information can be used to associate information received from the reflected data signals 24 with a specific wireless communication device 12. For example, if a wireless communication device 12 reflectively communicates its identification and the temperature of its associated container 10 to the receiver 30, the receiver 30 can record the temperature of the container 10 and determine if the temperature is within a desired range. For more information on tracking goods, such as containers 10, using wireless communication devices 12, see co-pending patent application Ser. No. 09/502,315, filed on Feb. 11, 2001, entitled "Deployable Identification Device," incorporated herein by reference in its entirety.

Figure 3:
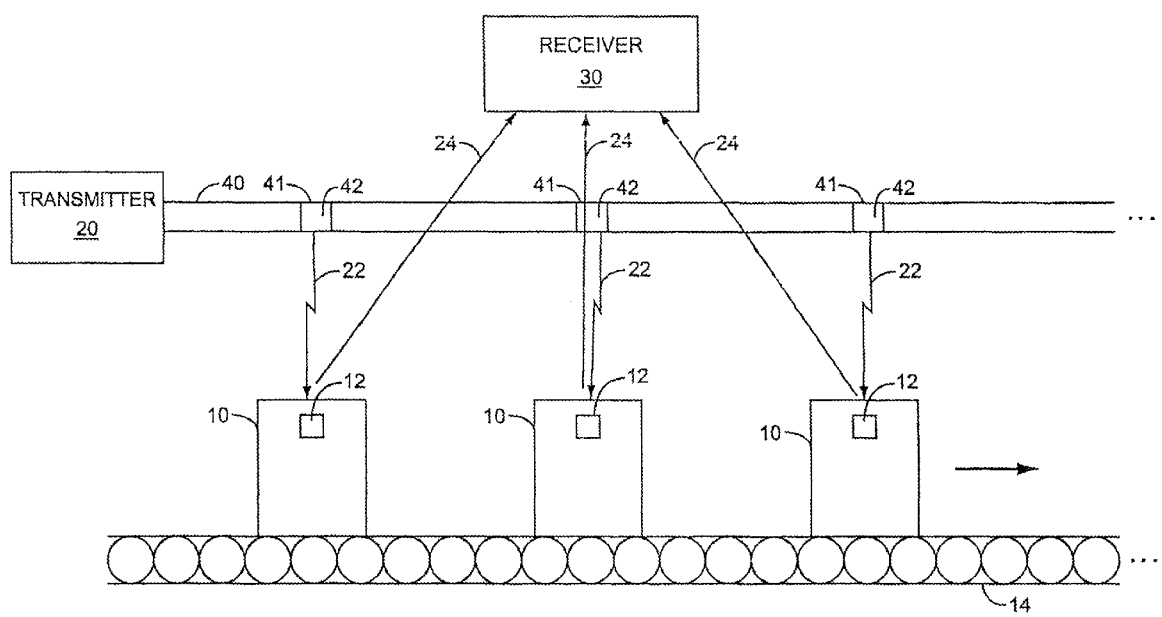
FIG. 3 is a schematic diagram of a communication system using a leaky-feeder transmitter to achieve reflective communication.

FIG. 3 illustrates another embodiment of the present invention that is similar to FIG. 1. However, the transmitter 20 is comprised of a leaky-feeder cable 40 transmission line. A leaky-feeder cable 40 is a cable or other conduit that has a plurality of openings 41 along its path. The leaky-feeder cable 40 contains an antenna 21 inside and all along the path of the leaky-feeder cable 40 (not shown). The antenna 21 is coupled to a single transmitter 20. In this manner, a communication signal 22 transmitted by the transmitter 20 is transmitted through the leaky-feeder cable 40 so that the communication signal 22 radiates out of the cable 40 at each of the openings 41.

The use of multiple openings 41 allows a single transmitter 20 using a leaky-feeder cable 40 to act as multiple transmitters 20. The cable 40 can be rapidly deployed in areas where interrogation of wireless communication devices 12 is required. Another advantage of a leaky-feeder cable 40 is that multiple power connections are not required at each point of radiation of the communication signal 22 as required for the multiple transmitters 20 illustrated in FIG. 1. Depending on the manufacturing and/or distribution facility, it may be difficult and/or prohibitively expensive to provide power sources at each desired point of radiation of the communication signal 22. Only the single transmitter 20 requires a power connection for the leaky-feeder cable 40 embodiment.

The leaky-feeder cable 40 may contain conductive sleeves 42 in the openings 41 that are retractable to open and close so that the communication signal 22 is not radiated through the opening 41 if the conductive sleeve 42 in the opening 41 is closed. In this manner, the leaky-feeder cable 40 may be configured to provide only the desired number of openings 41 for radiation of the communication signal 22. The communication signal 20 power can be spread across the exact desired number of openings 41 instead of radiating out of additional openings 41 that are either unneeded or not in proximity to the path of wireless communication devices 12.

The reflected data signals 24 received by the receiver 30 in the leaky-feeder cable 40 embodiment contain the same carrier frequency, just as in the embodiment illustrated in FIG. 1. However, there will be a time delay between the received reflected data signals 24 at the receiver 30 due to the time delay between the communication signal 22 radiated at different openings 41. A wireless communication device 12 located in the proximity of the opening 41 closest to the transmitter 20 will reflectively communicate a reflected data signal 24 to the receiver 30 sooner in time than a wireless communication device 12 located in proximity to an opening 41 located farther away. Depending on the geometry of the leaky-feeder cable 40, the receiver 30 can approximate the location of the wireless communication device 12 along the leaky-feeder cable 40. The receiver 30 can compare the relative time delay between reflected data signals 24 received from wireless communication devices 12, and determine which reflected data signals 24 originated from wireless communication devices 12 closer to the transmitter 20 than others due to the difference in time delay of the reflected data signals 24.

In another embodiment of the present invention, multiple transmitters 20 transmit communication signals 22 using direct spread spectrum communications. The transmitters 20 all transmit communication signals 22 using the same operating frequency, but using direct spread spectrum codes. Spread spectrum communications is a means of transmitting a communication signal over a much wider frequency bandwidth than the minimum bandwidth required to transmit the information. The communication signal 22 is mixed with a spread spectrum code from a spread spectrum coding sequence to "spread" the communication signal 22 across a wide bandwidth, thereby making the original communication signal 22 virtually undetectable. The original communication signal 22 is retrieved or "de-spread" by mixing the same spread spectrum code with the spread communication signal 22. More information on spread spectrum communications is disclosed in U.S. Pat. Nos. 4,112,372 and 6,266,362 and incorporated herein by reference in their entirety.

If the transmitters 20 transmit communication signals 22 that have been mixed with a spread spectrum code, the receiver 30 can configure itself to only receive reflected data signals 24 from wireless communication devices 12 that are in the range of a particular transmitter 20. In this manner, the receiver 30 can determine whether a received reflected data signal 24 was reflected from a wireless communication device 12 in the range of a selected transmitter 20. This allows the receiver 30 to have knowledge of range of location of a wireless communication device 12 and/or its associated container 10 (i.e., the field of view of the selected transmitter 20).

The receiver 30 has the spread spectrum coding sequences and the spread spectrum codes used by each of the transmitters 20 stored in memory. For example, if there are seven transmitters 20 in the communication system, each of the seven transmitters 20 must mix a different spread spectrum code with the communication signal 24 in order for the receiver 30 to be able to distinguish between different transmitters 20. In the present embodiment, the transmitters 20 use a spread spectrum coding sequence with a low cross-correlation index. The receiver 30 is programmed to have knowledge of the location of each of the transmitters 20. The receiver 30 can determine that a particular transmitter 20 originated a communication signal 22 that resulted in a received reflected data signal 24 by mixing the reflected data signal 24 with each of the spread spectrum codes in the spread spectrum coding sequence used by the transmitters 20. This process is called "synchronization," and is described below. When the receiver 30 mixes the reflected data signal 24 with a spread spectrum code that results in successful "de-spreading," the receiver 30 knows that the wireless communication device 12 that reflected the reflected data signal 24 is in the field of range of the transmitter 20 that used this same spread spectrum code to originally spread the communication signal 22.

Figure 4:
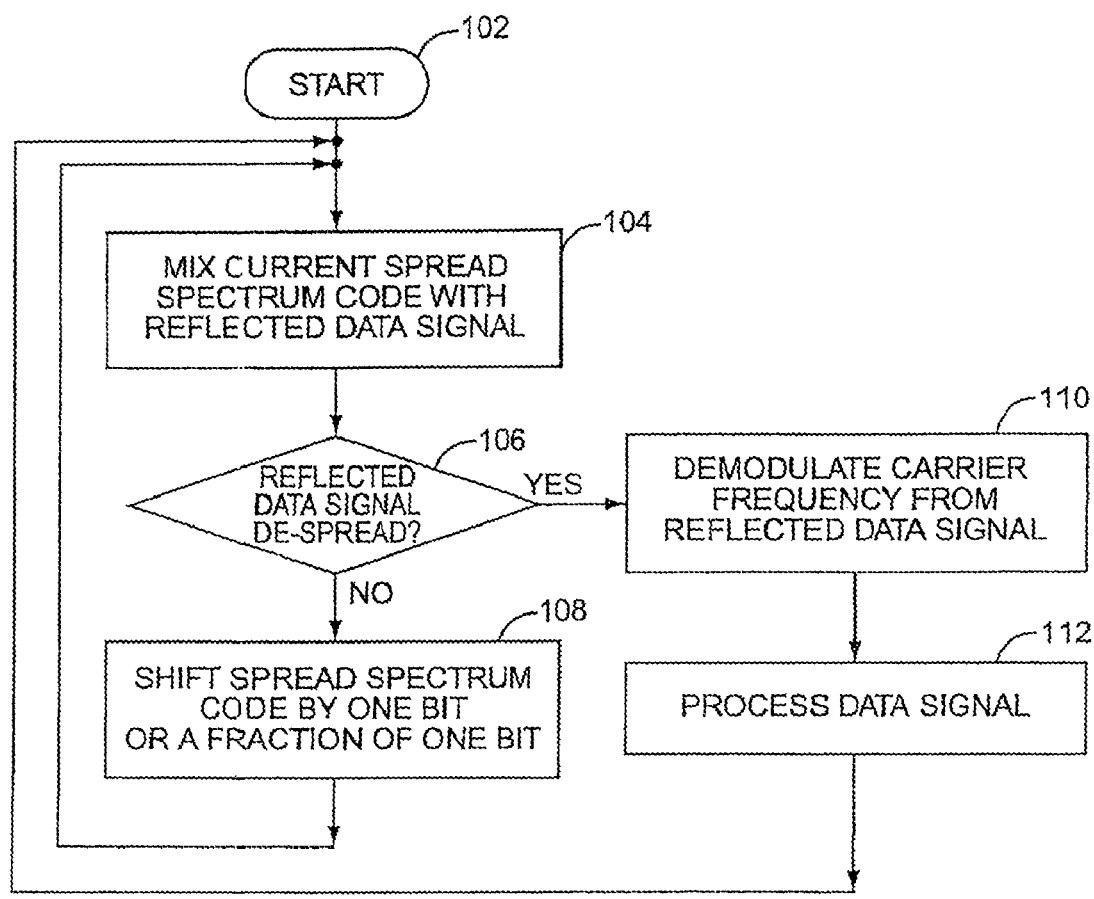
FIG. 4 is a flowchart diagram of the receiver mixing the received reflected data signal with a spread spectrum code to determine the approximate location of the wireless communication device that reflected the reflected data signal.

FIG. 4 illustrates a flowchart of the process of synchronization whereby the receiver 30 correlates or matches the spread spectrum code to the spread spectrum code used to spread the communication signal 22 contained in the received reflected data signal 24. The spread spectrum sequence is generated from a shift register of a defined number of bits, say 10, with a series of "taps" that are combined in an exclusive or logic function and fed back into the shift register input. This logic configuration, which can also be emulated in software, produces a 1023-bit-long pseudo random sequence; that is, every 1023 clock cycles to the shift register the code repeats itself. Dependent on the position of the taps, a number of discrete pseudo random sequences can be produced with low cross-correlation indices.

The process starts (block 102), and the receiver 30 mixes the reflected data signal 24 with the spread spectrum code from the spread spectrum coding sequence (block 104). The receiver 30 detects if the reflected data signal 24 was "de-spread" during the mixing process using the spread spectrum code (decision 106). If not, the receiver 30 shifts the spread spectrum coding sequence by one bit or a fraction of one bit (block 108) and repeats the process by mixing the reflected data signal 24 again with the shifted spread spectrum code (block 104). If the reflected data signal 24 has been successfully "de-spread" (decision 106), the receiver 30 recovers the data signal by demodulating the carrier frequency of the communication signal 24 from the reflected data signal (block 110) and processes the data signal for any desired purpose (block 112). The process repeats by the receiver 30 detecting the next reflected data signal received (decision 102).

Figure 5:
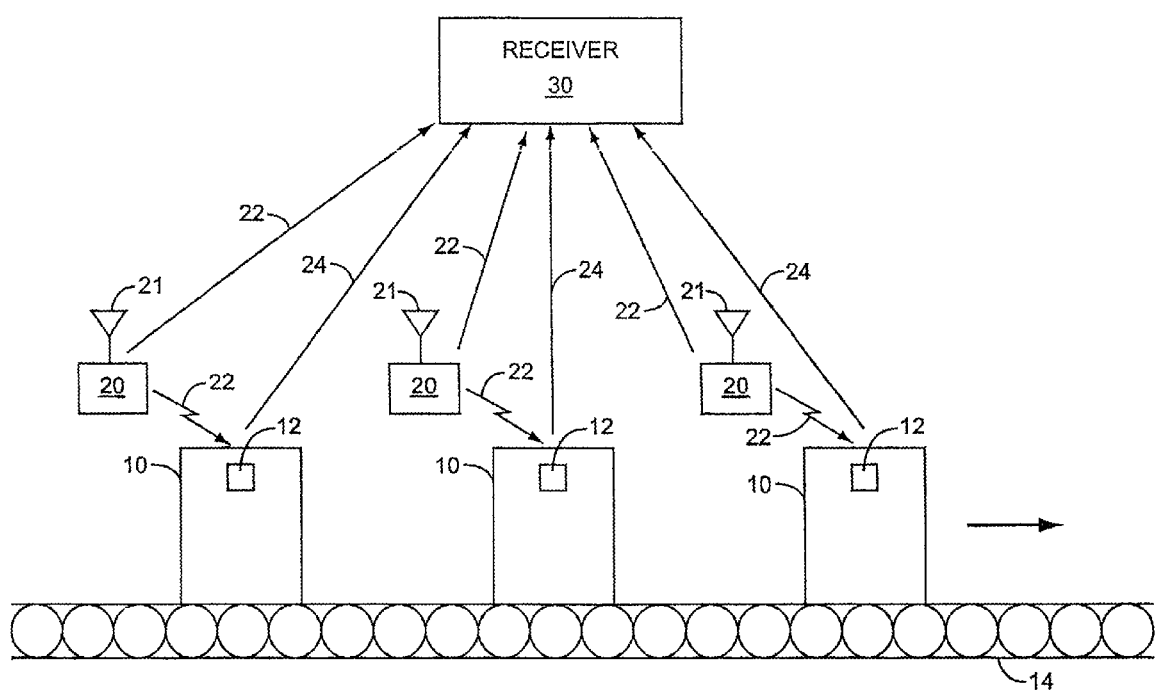
FIG. 5 is a schematic diagram of a second embodiment of a communication system using reflective communication.

FIG. 5 illustrates another embodiment of the present invention that is similar to FIG. 1. However, in this embodiment, the receiver 30 directly receives the communication signal 22 from the transmitter 20 as well as the reflected data signal 24. The receiver 30, by its direct receipt of the communication signal 22 and the reflected data signal 24, again by using the spread spectrum coding described above and illustrated in FIG. 4, can also determine the distance between the wireless communication device 12 and the transmitter 20 to achieve a more exact location of the wireless communication device 12.

Figure 6:
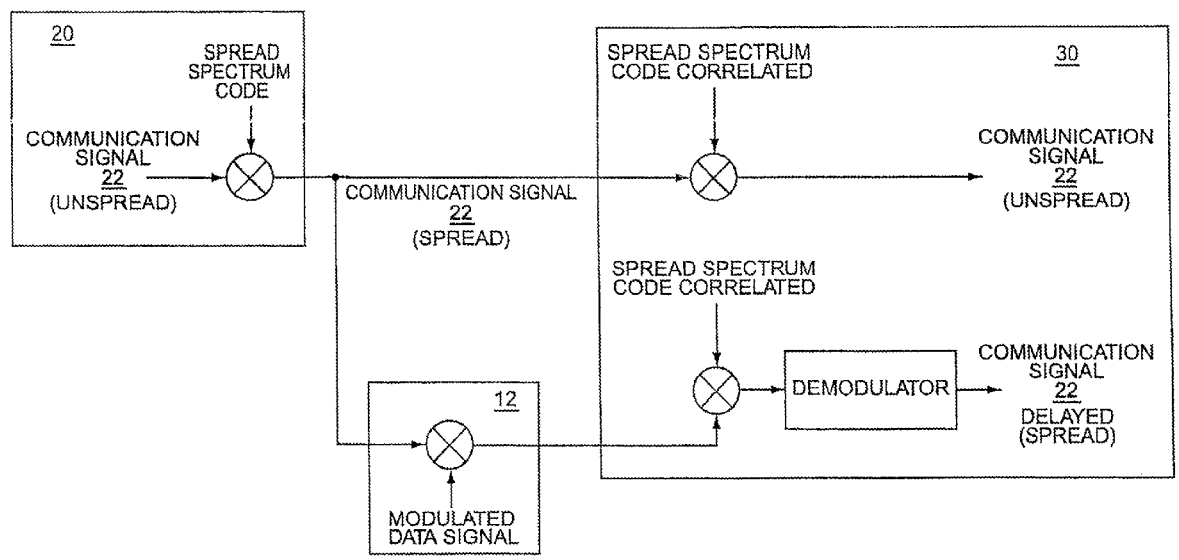
FIG. 6 is a flowchart diagram of the communication system illustrated in FIG. 5.

FIG. 6 illustrates a schematic signal diagram where the receiver 30 is able to determine both the transmitter 20 that transmitted the communication signal 22 to a wireless communication device 12 and the distance between the wireless communication device 12 and the transmitter 20. The receiver 30 receives the reflected data signal 24 just as described above and as illustrated in FIGS. 1 and 2. The receiver 30 sequences through the spread spectrum coding sequence to mix with the received reflected data signal 24, just as described above and illustrated in FIG. 3. When the receiver 30 mixes the correlated spread spectrum code with the reflected data signal 24, the resulting signal is the original communication signal 22 offset in frequency by the modulated data signal, as produced and reflected by the wireless communication device 12.

The receiver 30 also receives the communication signal 22 directly from the transmitter 20. The communication signal 22 has been mixed with the transmitter's 20 spread spectrum code, so the receiver 30 receives the communication signal 22 after it has been spread by the transmitter 20. The receiver 30 sequences through the spread spectrum coding sequence to mix with the communication signal 22 to de-spread the communication signal 22 back into its original format. After the receiver 30 de-spreads both the communication signal 22, received directly from the transmitter 20, and the reflected data signal 24, received from the wireless communication device 12, the receiver 30 can demodulate the modulated data signal from the de-spread reflected data signal 24.

The time delay between the de-spread communication signal 22 received directly from the transmitter 20 and the de-spread communication signal 22 obtained from the reflected data signal 24 can be correlated to the distance between the wireless communication device 12 and the transmitter 20. In this manner, the receiver 30 is able to determine which transmitter 20 interrogated the wireless communication device 12 and the distance between the wireless communication device 12 and the transmitter 20. If the transmitters 20 are configured so that multiple transmitters 20 can transmit the communication signal 22 to the same wireless communication device 12, and the receiver 30 knows the distance between transmitters 20, the receiver 30 can determine the exact location of a wireless communication device 12 that reflects a reflected data signal 24 to the receiver 30 using triangulation.

The embodiment illustrated in FIGS. 5 and 6 can be achieved using a communications signal 22 in which the frequency is varied in a known way with time. This is another form of spreading the communication signal in the frequency domain. By synchronizing its demodulating signal in frequency to a particular transmitter 20, the receiver 30 can listen to the reflected data signals 24 from wireless communication devices 12 of the chosen transmitter 20. In a similar way to direct sequence spread spectrum, system correlation may be used to determine range of the wireless communication devices 12.

Figure 7:
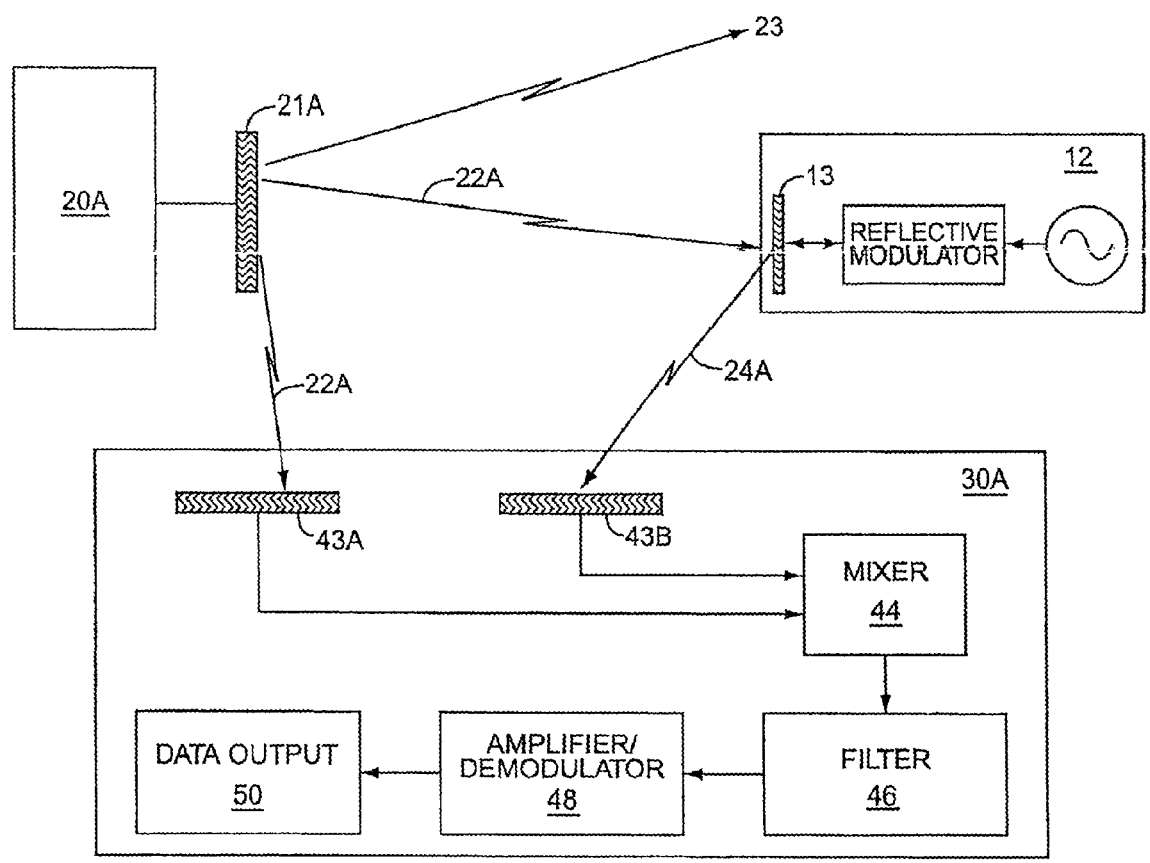
FIG. 7 is a schematic diagram of a reflective communication system using an incident radio signal from a Bluetooth transmitter as the communication medium.

In another embodiment of the present invention, illustrated in FIG. 7, the receiver 30A receives an incident radio signal energy from another communication system, either cooperatively or not, to form the communication signal 22 transmitted to the wireless communication device 12. In this manner, a transmitter 20 used for a different communication system can also be used to communicate a communication signal 22 to wireless communication devices 12 to be reflectively modulated to a receiver 30A. It may be that a manufacturing and/or distribution facility has transmitters 20 already installed in the path of manufacture and/or distribution of containers 10 or other goods that contain wireless communication devices 12 that can be used to accomplish the present invention as well.

This particular embodiment uses a transmitter 20 that complies with the "Bluetooth" standard, called a Bluetooth transmitter 20A. A Bluetooth transmitter 20A is a 2.45 GHz spread spectrum transceiver. The Bluetooth transmitter 20A uses Gaussian Frequency Shift Keying (GFSK) modulation with a modulation index between 0.28 and 0.35. The bit rate is 1 Mbps, and channel spacing is 1 MHz. More information about Bluetooth is disclosed in U.S. Pat. No. 6,255,800 entitled "Bluetooth Enabled Mobile Device Charging Cradle and System" and at www.bluetooth.com, both of which are incorporated herein by reference in their entirety The flood of energy from the communication signal 22A may be used to provide power and a communication medium for passive wireless communication devices 12 and a communication medium for semi-passive wireless communication devices 12 in the field of view of the Bluetooth transmitter 20A.

This transmitter 20A can be used to transmit communication signals 22A to both passive and semi-passive/active wireless communication devices 12. Passive wireless communication devices 12 utilize the energy from the communication signal 22A received through its antenna 13 by rectifying the incoming communication signal 22A, just as previously described for the embodiment illustrated in FIG. 1. If the energy received by the wireless communication device 12 from a single transmit cycle of the communication signal 22A from the Bluetooth transmitter 20A is not sufficient to power the wireless communication device 12, the wireless communication device 12 can store energy from multiple bursts of the communication signal 22A. When a sufficient amount of energy is available to the wireless communication device 12, the wireless communication device 12 reflectively modulates the communication signal 22A with a data signal containing data stored in the wireless communication device 12 and/or associated with its container 10.

Semi-passive wireless communication devices 12 can operate in essentially the same manner as passive wireless communication devices 12. However, since semi-passive wireless communication devices 12 contain a battery or other energy source as a power source, semi-passive wireless communication devices 12 do not need to wait to store energy from multiple bursts of the communication signal 22A. The energy in the power source can be used to produce a reflected data signal 24A on the first transmission of the communication signal 22A from the Bluetooth transmitter 20A.

The reflected data signal 24A is recovered by a receiver 30A, as illustrated in FIG. 7. The receiver 30A is ideally placed close to the Bluetooth transmitter 20A so that it will receive a relatively strong sample of the communication signal 22A since a Bluetooth transmitter 20A is a relatively short range transmitter. A first antenna 43A in the receiver 30A is configured to receive the communication signal 22A at the 2.45 GHz operating frequency from the Bluetooth transmitter 20A. The second antenna 43B is configured to receive the reflected data signal 24A from the wireless communication device 12. A mixer 44 inside the receiver 30A mixes the communication signal 22A with the reflected data signal 24A to remove the GFSK modulation from the original communication signal 22A, which is also present in the reflected data signal 24A. When the mixing occurs, the communication signal 22A(f1) mixes with the reflected data signal 24A to produce f1 and f2 and the data signal. The mixed product of the communication signal 22A with itself (as included in the reflected data signal 24A) yields a DC signal, representing the cancellation of the modulation frequency, the reflected data signal 24, and a frequency signal of two times the modulation frequency (f1 and f2). The DC and (f1 and f2) signals are rejected using an appropriate filter, as is well understood.

The receiver 30A recovers the original data signal reflectively modulated onto the communication signal 22A by the wireless communication device 12 by filtering out the two times the frequency of the communication signal 22A using a filter 46. Next an amplifier and demodulator 48 in the receiver 30A amplifies and demodulates the data signal to provide the data in clear format. The data can then be processed and/or output to any other system using a data output 50.

Figure 8:
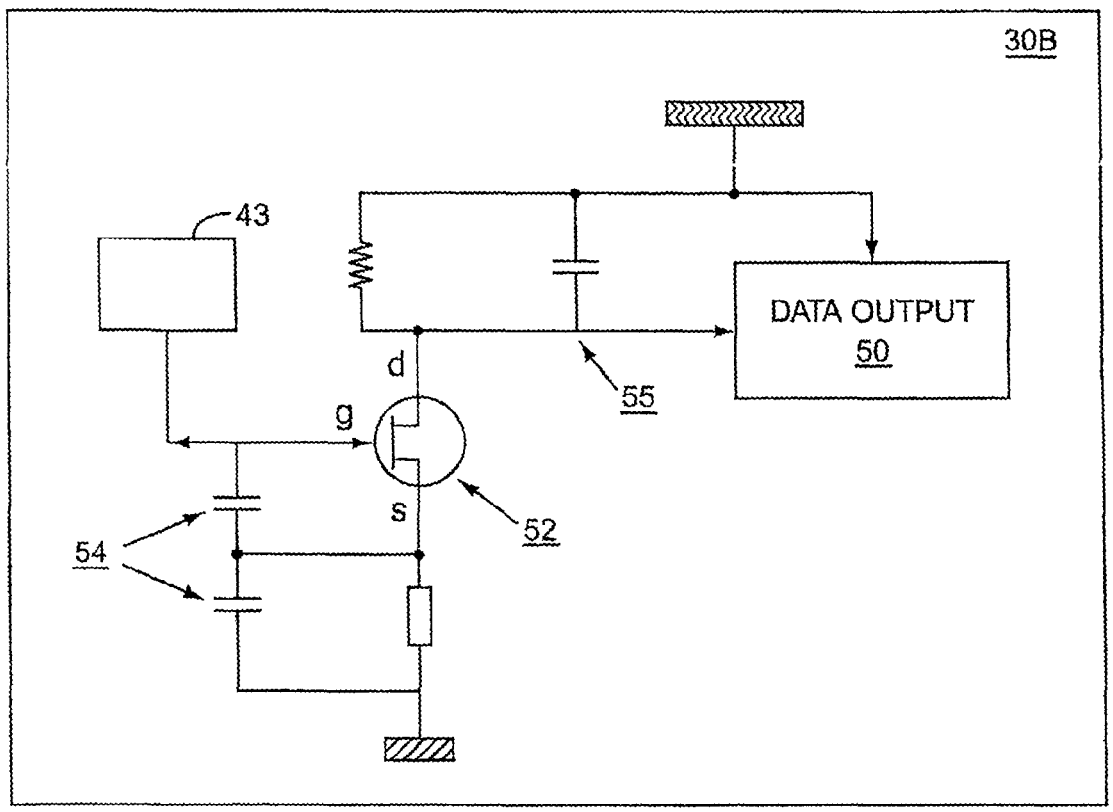
FIG. 8 is a schematic diagram of one embodiment of a receiver in the communication system illustrated in FIG. 6.

FIG. 8 illustrates an alternative embodiment of the receiver 30A that is cost reduced by reducing the complexity and power consumption of the receiver 30A. The alternative receiver is illustrated as receiver 30B. The GaAs field-emitting transistor (FET) 52 is biased such that the input at the gate terminal looks like a negative resistance with its feedback components 54. The magnitude and phase of the input remains in a stable state when connected to the antenna 43. The FET 52 is biased at low level so that a relatively small communication signal 22A from the Bluetooth transmitter 20A causes it to compress and become non-linear. In this compressed state, the receiver 30B will efficiently mix the communication signal 22A and the reflected data signal 24A together. The byproduct of the modulated data signal is recovered in the drain circuit 55 using a tuned circuit to the modulation frequency of the data signal. The drain circuit 55 demodulates the data signal to provide the data in clear format to the data output 50 to be processed and/or output to another system.

Figure 9:
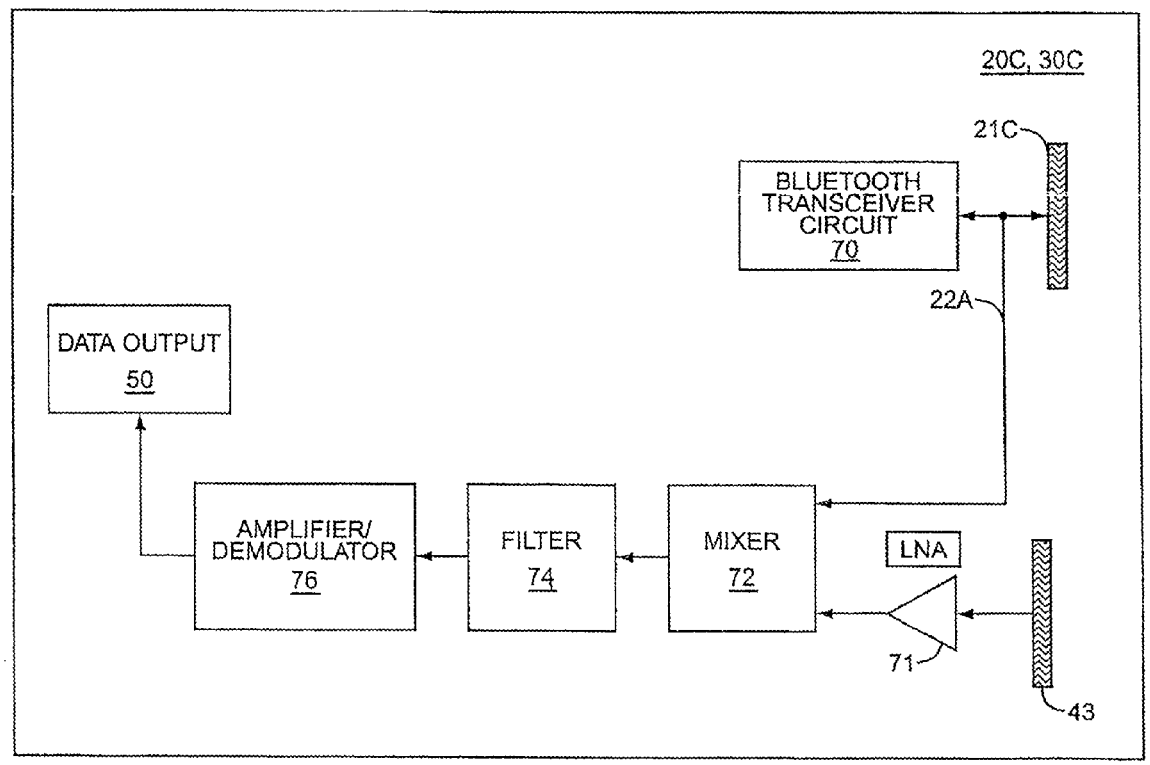
FIG. 9 is a schematic diagram of a combined transmitter and receiver for the communication system illustrated in FIG. 7.

FIG. 9 illustrates another alternative embodiment of a Bluetooth transmitter 20A. In this embodiment, the Bluetooth transmitter 20A and the receiver 30A are integrated and combined into a single Bluetooth transceiver 20C, 30C. In this embodiment, a directly connected portion of the communication signal 22A is used as the local oscillator for the mixing process to remove the communication signal 22A from the reflected data signal 24A. Two separate antennas 21 and 43 are still provided. The first antenna 21 is the Bluetooth transceiver 20C, 30C transmit and receive antenna. The second antenna 43 receives the reflected data signal 24A from the wireless communication device 12.

When the Bluetooth transceiver 20C, 30C receives the reflected data signal 24A from a wireless communication device 12 through antenna 43, the reflected data signal 24A is passed through a low noise amplifier 71. A mixer 72 inside the Bluetooth transceiver 20C, 30C mixes the communication signal 22A with the reflected data signal 24A to remove the GFSK modulation from the original communication signal 22A, which is also present in the reflected data signal 24A. The mixed product of the communication signal 22A with itself yields 0 or DC and two times the frequency and the data signal. A filter 74 filters out the two times the frequency of the communication signal 22A. An amplifier and demodulator 76 amplifies and demodulates the data signal to provide the data in clear format. The data can then be processed and/or output to any other system using the data output 50.

Certain modifications and improvements will occur to those skilled in the art upon a reading of the foregoing description. It should be understood that the present invention is not limited to any particular type of component, including but not limited to the container 10, the wireless communication device 12, the transmitter 20, the antenna 21, the communication signal 22, the reflected data signal 24, and the receiver 30.

One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

The embodiments of the invention in which an exclusive property or privilege is claimed are defined as follows:

1. A method of processing a reflected data signal, the method comprising:
   receiving, at a receiver, an incident radio signal and the reflected data signal, wherein the incident radio signal is received from a transmitter located at a known location and the reflected data signal is received from a wireless communication device that uses the incident radio signal as a communication medium, wherein the incident radio signal has been mixed with a transmitter spread spectrum code that is associated with the transmitter, and wherein the wireless communication device has reflectively modulated the incident radio signal with a data signal having a modulation to form the reflected data signal;
   analyzing the reflected data signal received from the wireless communication device to identify the transmitter spread spectrum code of the incident radio signal that was reflectively modulated by the wireless communication device;
   identifying the transmitter that transmitted the incident radio signal based on the identified transmitter spread spectrum code;
   determining a distance between the wireless communication device and the transmitter that transmitted the incident radio signal based on data that includes a time delay between receipt of the incident radio signal and receipt of the reflected data signal by the receiver; and
   determining an approximate location of the wireless communication device based on data that includes the known location of the transmitter and the determined distance between the wireless communication device and the transmitter.

2. The method of claim 1, further comprising removing the modulation from the reflected data signal to form data.

3. The method of claim 2, further comprising, at the receiver, mixing the incident radio signal with the reflected data signal.

4. The method of claim 2, wherein said removing the modulation comprises demodulating the modulation from the reflected data signal.

5. The method of claim 1, wherein said analyzing the reflected data signal comprises correlating a receiver spread spectrum code from a spread spectrum coding sequence in the receiver to the transmitter spread spectrum code in the reflected data signal by mixing the receiver spread spectrum code with the reflected data signal and determining whether said mixing results in de-spreading the reflected data signal so that the reflected data signal is recovered in unspread format.

6. The method of claim 5, further comprising sequencing through the receiver spread spectrum codes in the spread spectrum coding sequence to identify the receiver spread spectrum code that, when mixed with the reflected data signal, results in de-spreading the reflected data signal and thereby correlates to the transmitter spread spectrum code.

7. The method of claim 1, wherein the reflected data signal is received from a wireless communication device in a field of transmission of a transmitter in a plurality of transmitters, the method further comprising choosing a receiver spread spectrum code that correlates to the transmitter spread spectrum code and identifies the transmitter that transmitted the incident radio signal.

8. The method of claim 7, further comprising mixing the receiver spread spectrum code with the reflected data signal to de-spread the reflected data signal and recover the reflected data signal in unspread format.

9. The method of claim 1, wherein the reflected data signal communicates information stored in the wireless communication device that is related to a container associated with the wireless communication device.

10. The method of claim 1, wherein the incident radio signal is reflectively modulated with a Manchester bi-phase encoded data signal.

11. A reflective communication system, comprising:
    transmitting means for transmitting an incident radio signal mixed with a transmitter spread spectrum code to a wireless communication device, wherein the transmitter spread spectrum code is associated with the transmitting means;
    receiving means for receiving both a reflected data signal from the wireless communication device and the incident radio signal from the transmitting means, wherein the wireless communication device has reflectively modulated the incident radio signal with a data signal having a modulation to form the reflected data signal;
    analyzing means for analyzing the reflected data signal to identify the transmitter spread spectrum code of the incident radio signal that was reflectively modulated by the wireless communication device;
    means for identifying the transmitting means that transmitted the incident radio signal based on the identified transmitter spread spectrum code;
    means for determining a distance between the wireless communication device and the transmitting means that transmitted the incident radio signal based on data that includes a time delay between receipt of the incident radio signal and receipt of the reflected data signal by the receiving means; and
    means for determining an approximate location of the wireless communication device based on data that includes a known location of the transmitting means and the determined distance between the wireless communication device and the transmitting means.

12. The reflective communication system of claim 11, further comprising means for removing the modulation from the reflected data signal by mixing the incident radio signal with the reflected data signal and demodulating the modulation.

13. The reflective communication system of claim 11, wherein the analyzing means for analyzing the reflected data signal is configured to correlate a receiver spread spectrum code from a spread spectrum coding sequence to the transmitter spread spectrum code in the reflected data signal by mixing the receiver spread spectrum code with the reflected data signal and determining whether said mixing results in de-spreading the reflected data signal so that the reflected data signal is recovered in unspread format.

14. The reflective communication system of claim 13, wherein the analyzing means for analyzing the reflected data signal is further configured to sequence through the receiver spread spectrum codes in the spread spectrum coding sequence to identify the receiver spread spectrum code that, when mixed with the reflected data signal, results in de-spreading the reflected data signal and thereby correlates to the transmitter spread spectrum code.

15. The reflective communication system of claim 13, wherein the receiver spread spectrum codes in the spread spectrum coding sequence have a low cross-correlation index.

16. A reflective communication system, comprising:
    means for receiving an incident radio signal from a transmitter located at a known location, wherein the incident radio signal has been mixed with a transmitter spread spectrum code that is associated with the transmitter;
    means for receiving a reflected data signal from a wireless communication device, wherein the reflected data signal has been formed by reflective modulation of the incident radio signal with a data signal having a modulation;

means for mixing one or more receiver spread spectrum codes from a spread spectrum coding sequence with the reflected data signal to identify a receiver spread spectrum code that correlates to the transmitter spread spectrum code and successfully de-spreads the reflected data signal;

means for identifying the transmitter that transmitted the incident radio signal from other transmitters that use different spread spectrum codes based on the identified receiver spread spectrum code that correlates to the transmitter spread spectrum code;

means for determining a distance between the wireless communication device and the identified transmitter that transmitted the incident radio signal based on data that includes a time delay between receipt of the incident radio signal and receipt of the reflected data signal by the means for receiving the incident radio signal and the means for receiving the reflected data signal, respectively; and means for determining an approximate location of the wireless communication device based on data that includes the known location of the identified transmitter and the determined distance between the wireless communication device and the identified transmitter.

17. The reflective communication system of claim 16, wherein the means for receiving the reflected data signal is configured to remove the modulation from the reflected data signal by mixing the incident radio signal with the reflected data signal and demodulating the modulation.

18. The reflective communication system of claim 16, wherein the means for mixing one or more receiver spread spectrum codes is configured to determine whether the mixing results in de-spreading the reflected data signal so that the reflected data signal is recovered in unspread format.

19. The reflective communication system of claim 16, wherein the means for identifying the transmitter that transmitted the incident radio signal is configured to sequence through the receiver spread spectrum codes in the spread spectrum coding sequence to identify the receiver spread spectrum code that, when mixed with the reflected data signal, results in de-spreading the reflected data signal and thereby correlates to the transmitter spread spectrum code.

20. The reflective communication system of claim 16, wherein the receiver spread spectrum codes in the spread spectrum coding sequence have a low cross-correlation index.

* * * * *